(12) United States Patent
Hsu

(10) Patent No.: US 12,700,890 B2
(45) Date of Patent: Aug. 4, 2026

(54) RADIO-FREQUENCY FRONT-END MODULE

(71) Applicant: RichWave Technology Corp., Taipei City (TW)

(72) Inventor: Chia-Wei Hsu, Taipei City (TW)

(73) Assignee: RichWave Technology Corp., Taipei City (TW)

( * ) Notice: Subject to any disclaimer, the term of this patent is extended or adjusted under 35 U.S.C. 154(b) by 283 days.

(21) Appl. No.: 18/542,780

(22) Filed: Dec. 18, 2023

(65) Prior Publication Data

US 2025/0096838 A1     Mar. 20, 2025

(30) Foreign Application Priority Data

Sep. 20, 2023     (TW) ................................. 112135841

(51) Int. Cl.
H04B 1/04          (2006.01)
H04B 1/18          (2006.01)
H04B 1/48          (2006.01)
(52) U.S. Cl.
CPC ...................................... H04B 1/48 (2013.01)
(58) Field of Classification Search
None
See application file for complete search history.

(56) References Cited

U.S. PATENT DOCUMENTS

| | | | | |
|---|---|---|---|---|
| 10,432,238 B1 * | 10/2019 | Luo | .......................... | H04B 1/18 |
| 2019/0097606 A1 * | 3/2019 | Nosaka | .................... | H04B 1/40 |

| | | | | |
|---|---|---|---|---|
| 2020/0083865 A1 * | 3/2020 | Mori | ....................... | H03H 9/706 |
| 2020/0280296 A1 * | 9/2020 | Mori | ....................... | H03H 7/465 |
| 2021/0159887 A1 * | 5/2021 | Tomita | .................... | H03H 7/18 |
| 2023/0179242 A1 * | 6/2023 | Hsieh | ................... | H03H 7/0115 |

FOREIGN PATENT DOCUMENTS

| | | | | | |
|---|---|---|---|---|---|
| EP | 1916772 A1 * | 4/2008 | ........... | H04B 1/0057 |
| JP | 2007150417 A * | 6/2007 | ............. | H03F 3/601 |
| KR | 20130016597 A * | 2/2013 | ........... | H04B 1/0458 |
| WO | WO-2020043872 A1 * | 3/2020 | ............... | H04B 1/18 |

OTHER PUBLICATIONS

Office action mailed on May 9, 2024 for the Taiwan application No. 112135841, filing date Sep. 20, 2023, pp. 1-12.

* cited by examiner

*Primary Examiner* — Mohammed Rachedine
(74) *Attorney, Agent, or Firm* — Winston Hsu

(57)          ABSTRACT

A radio-frequency front-end module includes a common node, a first node, a second node, a third node, a first path, a second path and a third path. The first path may be disposed between the common node and the first node and may include an inductor. The second path may be disposed between the common node and the second node and may include a second switch. The third path may be disposed between the common node and the third node and include a third switch. When the second switch is turned on, the second path may transceive the second signal and the third switch may be turned off, such that the inductor in the first path may provide an inductive impedance for the second signal, and the third switch may provide a capacitive impedance for the second signal.

10 Claims, 11 Drawing Sheets

RADIO-FREQUENCY FRONT-END MODULE

TECHNICAL FIELD

The disclosure is related to a radio-frequency front-end module, and more particularly, a radio-frequency front-end module including an inductor where the inductor may provide an inductive impedance so as to reduce return loss.

BACKGROUND

A radio-frequency (RF) front-end module may be configured to receive or transmit radio-frequency signals. Generally, a radio-frequency front-end module may include a radio-frequency switch, a filter and an amplifier. Radio-frequency front-end modules may be used in many communication devices, such as mobile communication devices, wireless networks (e.g. Wi-Fi), Bluetooth devices, global positioning system (GPS) devices, etc.

In a wireless transceiving device, radio-frequency front-end modules may be configured to process signals of different frequencies and powers. However, according to experiences, it may be a challenge to reduce return loss when using a radio-frequency front-end device. For example, if a radio-frequency front-end device includes a plurality of radio-frequency paths, when one of the radio-frequency paths is turned off, some elements (e.g. turned-off switches) of the radio-frequency path may provide a capacitive impedance. This may cause a combined impedance of the radio-frequency front-end module to be capacitive, which may located at the lower part of a Smith chart, resulting in undesired high return loss.

SUMMARY

An embodiment may provide a radio-frequency front-end module including a common node, a first node, a second node, a third node, a first path, a second path and a third path. The first path may be disposed between the common node and the first node and include a first inductor. The second path may be disposed between the common node and the second node and include a second switch. The second path may be configured to transceive a second radio-frequency signal. The third path may be disposed between the common node and the third node and include a third switch. The third path may be configured to transceive a third radio-frequency signal. When the second switch is turned on, the second path may transceive the second radio-frequency signal and the third switch may be turned off, such that the first inductor may provide a first inductive impedance for the second radio-frequency signal and that the third switch may provide a first capacitive impedance for the second radio-frequency signal.

DETAILED DESCRIPTION

Figure 1:
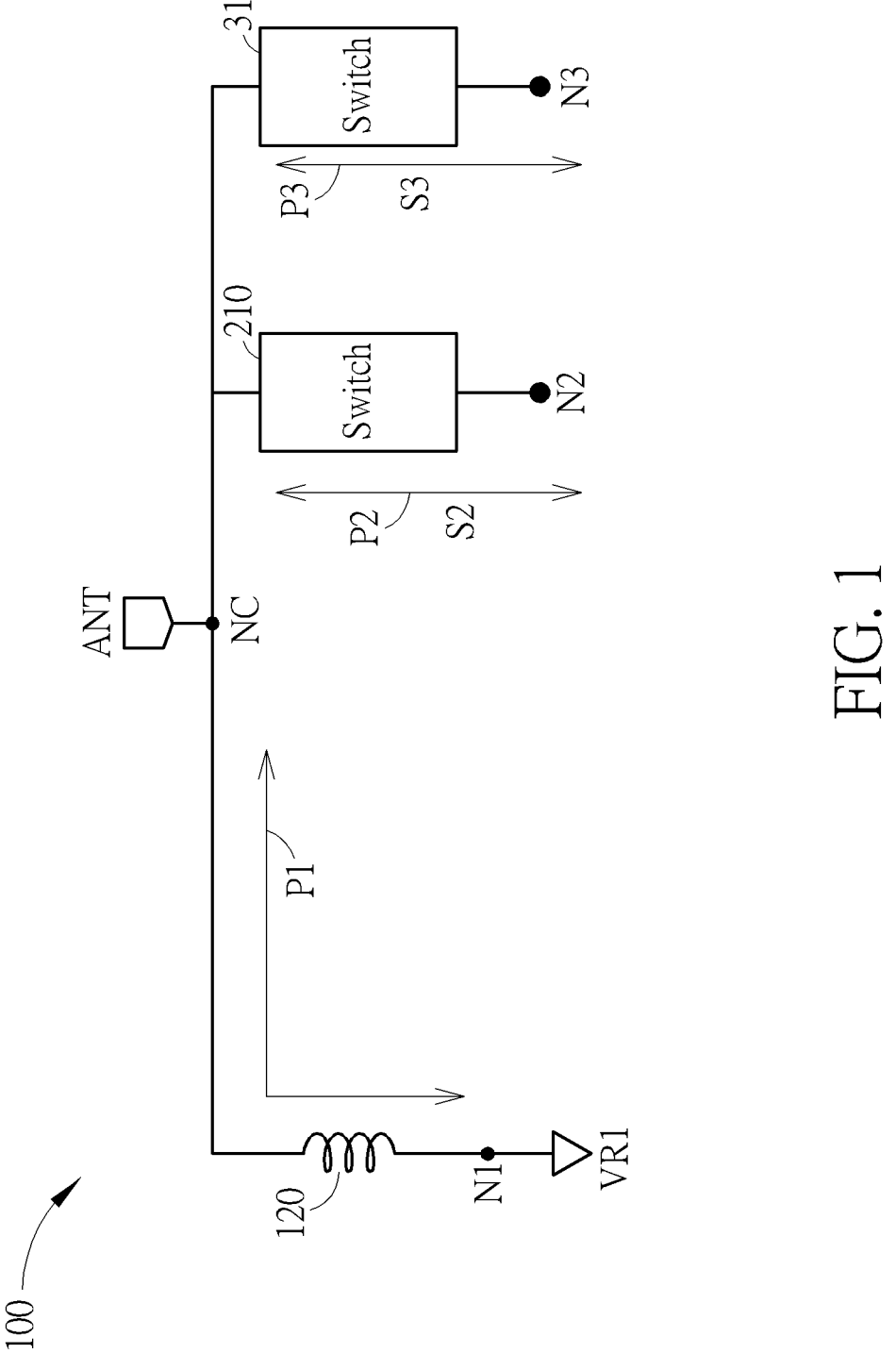
FIG. 1 illustrates a RF front-end module according to an embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

In the text, when a RF path is turned on, a switch coupled in series in the RF path may be turned on. When a RF path is turned off, a switch coupled in series in the RF path may be turned off. In the text, if a RF path further includes a shunt circuit, when the RF path is turned on, a switch coupled in series in the RF path may be turned on, and the shunt circuit may be turned off. When the RF path is turned off, the switch coupled in series in the RF path may be turned off, and the shunt circuit may be turned on. In the text, when a component is turned on, an operation state of the component may be an ON state. When a component is turned off, the operation state of the component may be an OFF state.

Figure 2:
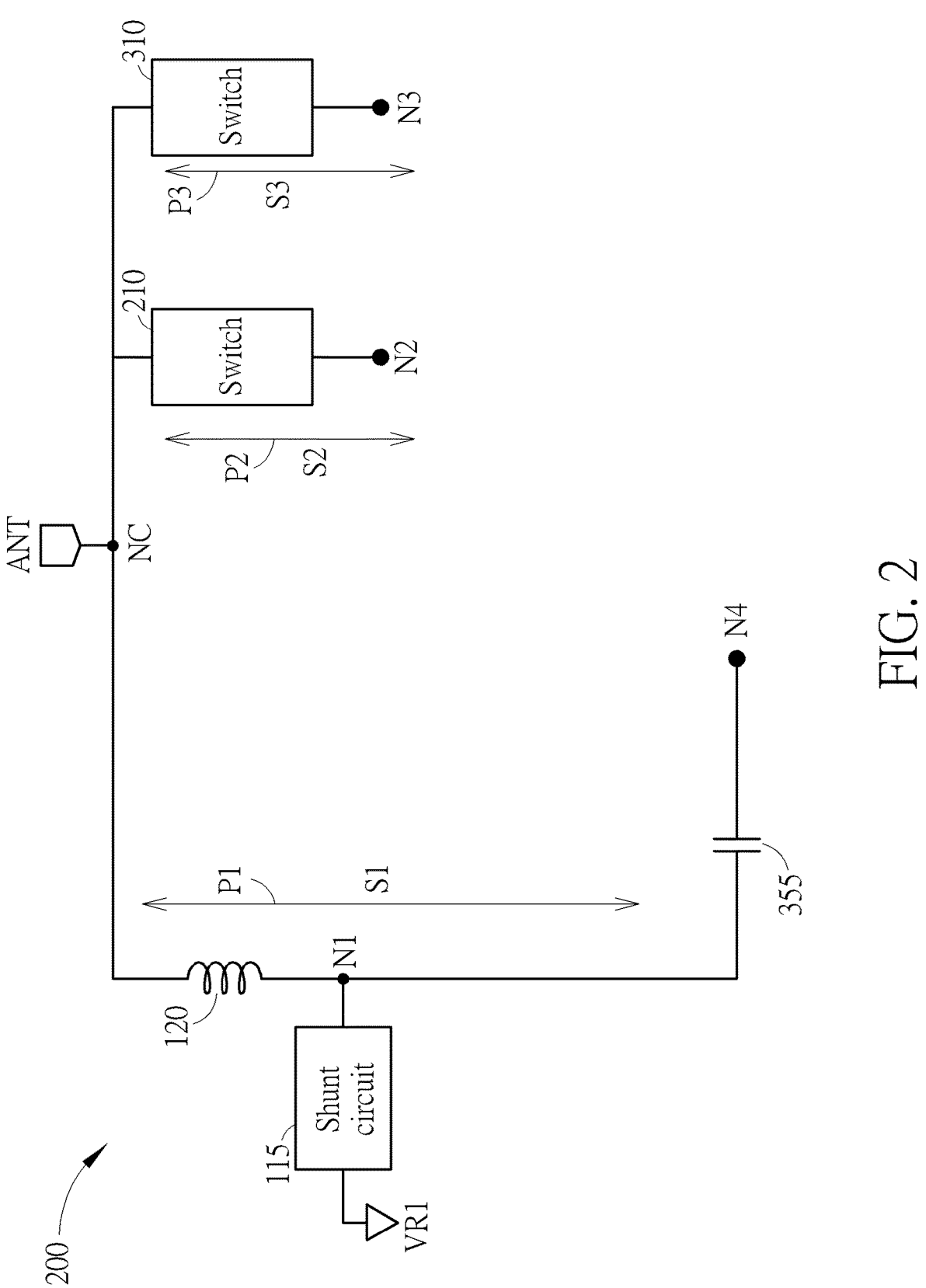
FIG. 2-FIG. 9 illustrate various RF front-end modules according to various embodiments.
Figure 3:
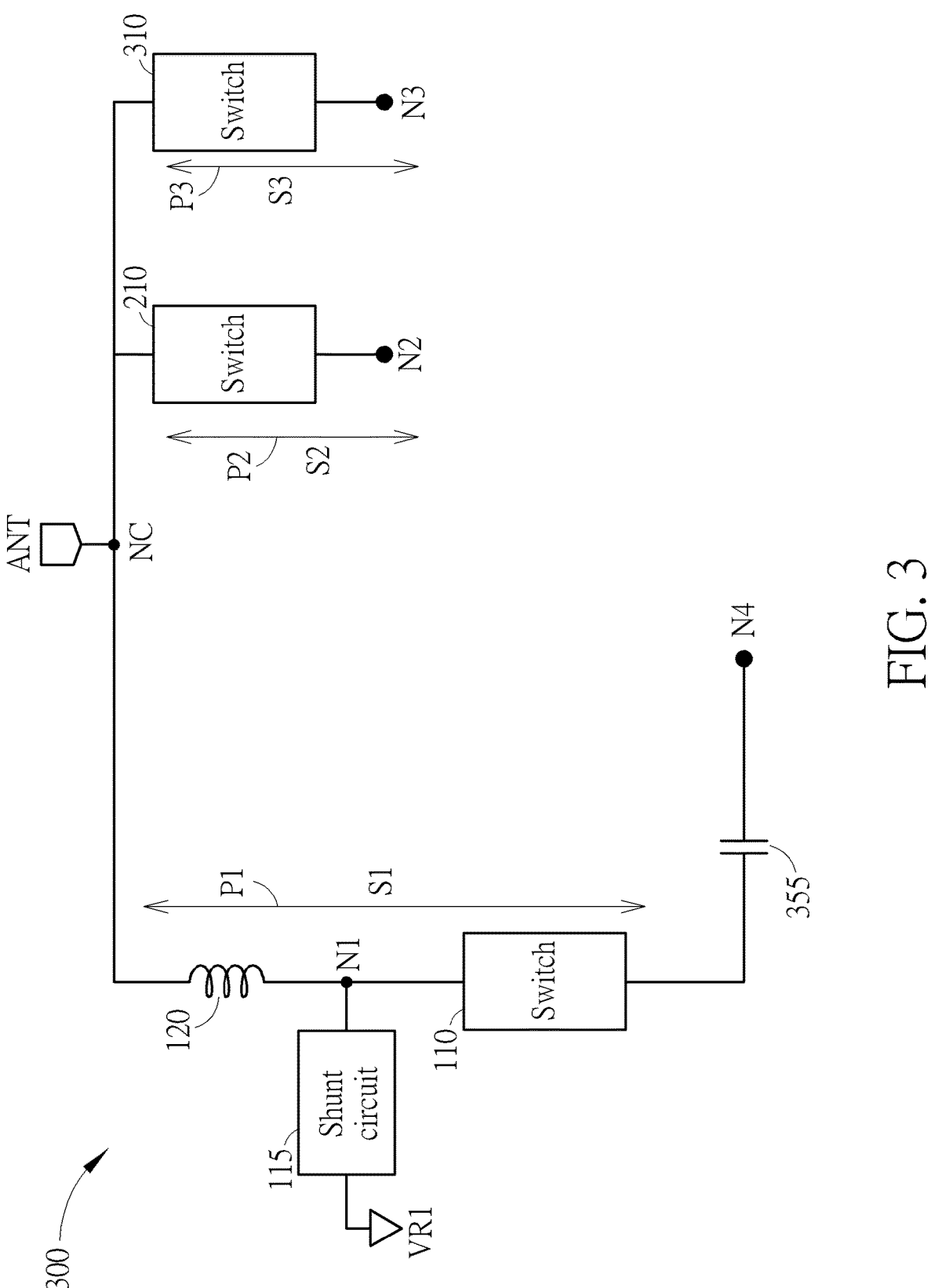

FIG. 1 illustrates a RF front-end module 100 according to an embodiment. FIG. 2 illustrates a RF front-end module 200 according to another embodiment. FIG. 3 illustrates a RF front-end module 300 according to yet another embodiment In FIG. 1, the RF front-end module 100 may include a common node NC, a node N1, a node N2, a node N3, a RF path P1, a RF path P2 and a RF path P3. The RF path P1 may at least include a path disposed between the common node NC and the node N1, and the RF path P1 may include an inductor 120. As shown, the inductor 120 may include a first terminal and a second terminal, the first terminal is coupled to the common node NC, and the second terminal is coupled to the node N1. Further, the node N1 is coupled to a reference voltage node VR1, such as a grounding node. The RF path P2 may at least include a path disposed between the common node NC and the node N2 and may include a switch 210. The RF path P3 may at least include a path disposed between the common node NC and the node N3 and may include a switch 310. In some embodiments, the RF path P2 and the RF path P3 may be configured to transceive RF signals S2 and S3 respectively. Furthermore, the common node NC may be coupled to an antenna ANT, the node N1 may be a grounding node, and the nodes N2 and N3 may be signal transceiving nodes.

For example, when the switch 210 of the RF path P2 is turned on, the RF path P2 may be configured to transceive the RF signal S2. In this case, the switch 310 of the RF path P3 may be turned off. As for the RF signal S2 of the RF path P2, the switch 310 in OFF state may function equivalently as a capacitor, so it may provide a capacitive impedance. Without the RF path P1, the capacitive impedance provided by the RF path P3 (such as by the switch 310 thereof) may be located at a lower part of a Smith chart, that is, a part below a horizontal central line, where the horizontal central line may pass through the center of the Smith chart. The horizontal central line of a Smith chart may also be described as a middle line of the Smith chart. Comparatively, with the RF path P1, the inductor 120 of the RF path P1 may provide an inductive impedance for the RF signal S2 of the RF path P2, and a combined impedance may be generated based on the inductive impedance provided by the inductor 120 and the capacitive impedance provided by the RF path P3. The combined impedance may be located at a higher part of the Smith chart, which may be closer to the horizontal central line of the Smith chart. That is, relative to the lower location corresponding to the capacitive impedance provided by the RF path P3, the higher location corresponding to the combined impedance may be upward closer to the horizontal central line. In other words, the inductive impedance provided by the inductor 120 of the RF path P1 may at least partially counteract the capacitive impedance provided by the switch 310. Therefore, as for the RF signal S2, Compared to the impedance provided by the RF path P3 without the RF path P1, a combined impedance provided by the combination of the RF paths P1 and P3 may be located, in the Smith chart, more closely to the horizontal central line. Therefore, the combined impedance may be bring closer to desired impedance of the system.

In some embodiments, the desired impedance of the system may correspond to a real part of the impedance, and a capacitive impedance and/or an inductive impedance may correspond to an imaginary part of the impedance. Therefore, in the embodiment, an absolute value of an imaginary part of the combined impedance provided by the RF paths P1 and P3 may be reduced. Moreover, if the inductive impedance provided by the inductor 120 completely counteract the capacitive impedance provided by the switch 310 (that is, the inductive impedance and the capacitive impedance are fully counteracted by each other), the absolute value of the imaginary part of the combined impedance may be zero. As a result, in the embodiment, with the configuration of the RF paths P1 and P3, the return loss of the RF signals is reduced by using the RF front-end module 100. Below with respect to FIG. 11, a Smith chart will be further described. According to the embodiments, the frequency of the RF signal S2 and may be identical or different from the frequency of the RF signal S3.

In the embodiment shown in FIG. 1, the RF path P1 may be configured to provide an inductive impedance, and may not be configured for transceiving signals. It should be noted that the above description takes the RF signal S2 of the RF path P2 as an example, and the disclosure may not be such limited. In other embodiments, as for the RF signal S3 transceived via the RF path P3, a combined impedance provided by the combination of the RF paths P1 and P2 may be bring closer to desired impedance of the system, as compared to the case of the RF path P2 without the RF path P1.

FIG. 2 illustrates a RF front-end module 200 according to an embodiment. The similarities between the RF front-end modules 200 and 100 may not be repeated. As shown in FIG. 2, the RF path P1 of the RF front-end module 200 may at least include a path disposed between the common node NC and the node N4. The RF path P1 may further include a shunt circuit 115 and a capacitor 355.

FIG. 3 illustrates a RF front-end module 300 according to an embodiment. The similarities between the RF front-end modules 300 and 200 may be not repeated. As shown in FIG. 3, the RF path P1 may further include a switch 110. In the embodiment, the RF path P1 may be configured to transceive a RF signal S1. The inductor 120 may include a first terminal coupled to the common node NC, and a second terminal coupled to the node N1. The shunt circuit 115 may include a first terminal and a second terminal, the first terminal may be coupled to the inductor 120, and the second terminal may be coupled to the reference voltage node VR1. The reference voltage node VR1 may such as be a grounding node. The switch 110 may include a first terminal and a second terminal, the first terminal may be coupled to the inductor 120, and the second terminal may be coupled to the capacitor 355. The capacitor 355 may include a first terminal and a second terminal, the first terminal may be coupled to the switch 110, and the second terminal may be coupled to the node N4. Further, the second terminal of the inductor 120, the first terminal of the shunt circuit 115, and the first terminal of the switch 110 may all be coupled to the node N1. In the embodiment, the capacitor 355 may be optionally disposed at a selected location of the RF path P1, so as to block an interference portion of the signal.

When the RF signal S2 is transceived via the RF path P2 or the RF signal S3 is transceived via the RF path P3, the shunt circuit 115 of the RF path P1 may be turned on, such that the second terminal of the inductor 120 may be grounded, for example. Therefore, the inductor 120 of the RF path P1 may provide an inductive impedance for the RF signals S2 or S3, which may be similar to the embodiment shown in FIG. 2. Moreover, in this case, the switch 110 may be turned off to prevent undesired signals from being transceived to the node N4 through the switch 110. When the RF signal S1 is transceived via the RF path P1, the switch 210 and/or the switch 310 may be turned off, so as to avoid affecting the transmission of the RF signal S1.

Figure 4:
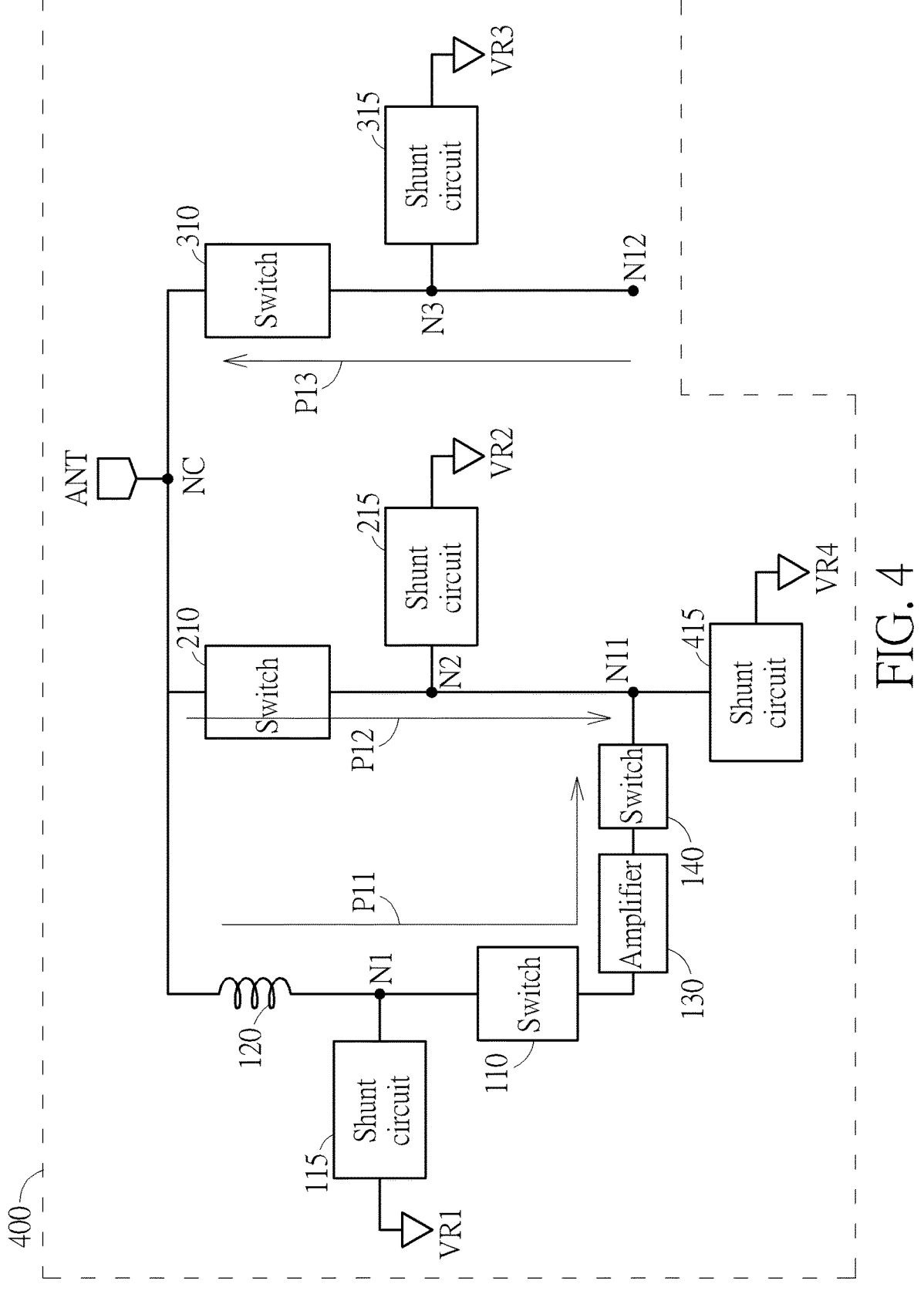

FIG. 4 illustrates a RF front-end module 400 according to another embodiment. As shown, the RF front-end module 400 may include a common node NC, a node N11, a node N12, a RF path P11, a RF path P12 and a RF path P13. Specifically, the RF path P11 may be disposed between the common node NC and the node N11, the RF path P12 may be disposed between the common node NC and the node N11, and the RF path P13 may be disposed between the common node NC and the node N12. In some embodiments, the RF path P11 may include an inductor 120, a shunt circuit 115, a switch 110, an amplifier 130, a switch 140 and/or a shunt circuit 415. The RF path P12 may include a switch 210, a shunt circuit 215 and/or a shunt circuit 415. The RF path P13 may include a switch 310 and a shunt circuit 315. In some embodiments, the shunt circuit 415 may be coupled to the node N11 and may be shared by the RF path P11 and the RF path P12.

In some embodiments, the RF front-end module 400 may be coupled to a processing circuit (not shown) through the node N11 or the node N12. The processing circuit may be configured to process signals from an antenna ANT, or be configured to provide signals to be transceived to the antenna ANT.

In some embodiments, the common node NC may be coupled to an antenna ANT. The node N11 and the node N12 may be configured for transmitting and/or receiving signals. For example, the node N11 may be a receiving node, and the node N12 may be a transmitting node. In this embodiment, as for the RF path P11 and/or the RF path P12, signals may be transmitted from the common node NC to the node N11. As for the RF path P13, signals may be transmitted from the node N12 to the common node NC. However, the signal directions mentioned here may be illustrative, and in other embodiments, the signal directions via the RF paths P11 to P13 may be different from those shown in FIG. 4, and signals may be bi-directionally transceived.

In the embodiment of FIG. 4, the RF path P12 may act as a bypass path for the RF path P11. For example, the RF path P11 may include an amplifier 130, and the RF path P12 may be a bypass path without an amplifier. When a signal received by the antenna ANT has a low amplitude or a low power, the signal may be transceived via the RF path P11 where the signal may be amplified by the amplifier 130. When a signal received by the antenna ANT has a amplitude or power high enough, the signal may be transceived via RF path P12 without amplifying.

In the RF path P11, the switch 110 may be coupled in series in the RF path P11. When the RF path P11 is turned off, the switch 110 may be turned off, such that the signals on the RF path P11 may not be transceived to the node N11.

In this case, the shunt circuit 115 may be turned on, such that an undesired signal on the RF path P11 may be directed to the reference voltage node VR1. The undesired signal may be a low power signal leaked or unexpectedly coupled to the RF path P11. When the RF path P11 is turned on, the switch 110 and the switch 140 may be turned on, such that the signals of the RF path P11 may be amplified by the amplifier 130, and then be substantially directed to the node N11. In this case, the shunt circuit 115 may be turned off to avoid affecting the signal transmission via the RF path P11. For example, the amplifier 130 may amplify signals from the common mode NC. The amplifier 130 may include an input terminal and an output terminal, the input terminal may receive a RF signal, and the output terminal may output the amplified RF signal. The inductor 120 and other component (s) (e.g. a capacitor) may form a matching network for the amplifier 130, and the matching network may be coupled to the input terminal and/or the output terminal of the amplifier 130. For example, the switch 140 may be coupled to the output terminal of the amplifier 130, so as to prevent undesired signals from being leaked or being unexpectedly coupled to the output terminal of the amplifier 130. The switch 140 may therefore be configured to improve the isolation of the RF front-end module 400.

In the RF path P12, the switch 210 may be coupled in series in the RF path P12. When the RF path P12 is turned off, the switch 210 may be turned off, such that signals on the RF path P12 may substantially not be directed to the node N11. In this case, the shunt circuit 215 may be turned on to shunt undesired signals on the RF path P12 to the reference voltage node VR2. When the RF path P12 is turned on, the switch 210 may be turned on, such that signals on the RF path P12 may substantially be directed to the node N11. In this case, the shunt circuit 215 may be turned off, so as to avoid affecting the signal transmission via the RF path P12.

As for the RF paths P11 and P12, the shunt circuit 415 may be coupled to the node N11. When the RF paths P11 and P12 are both turned off, the shunt circuit 415 may be turned on, so as to direct undesired signals to a reference voltage node VR4, preventing the undesired signals from being leaked or from being unexpectedly coupled to the RF paths P11 and P12. Therefore, the shunt circuit 415 may be configured to further improve the isolation of the RF front-end module 400.

In the RF path P13, the switch 310 may be coupled in series in the RF path P13. When the RF path P13 is turned off, the switch 310 may be turned off, such that signals on the RF path P13 may substantially not directed to the common node NC. In this case, the shunt circuit 315 may be turned on to shunt or direct undesired signals on the RF path P13 to the reference voltage node VR3. When the RF path P13 is turned on, the switch 310 may be turned on, such that signals on the RF path P13 may be substantially directed to the common node NC. In this case, the shunt circuit 315 may be turned off, so as to avoid affecting the signal transmission via the RF path P13.

In above embodiments, each of the reference voltage nodes VR1 to VR4 may be a grounding node. The shunt circuits 115, 215, 315 and/or 415 may each include a shunt switch.

In some embodiments, the RF front-end module 400 may be operated in a receiving mode or a transmitting mode. For example, as described above about the signal directions, in the receiving mode, RF signals may be transmitted from the common node NC to the node N11 via the RF path P11 or the RF path P12. In the receiving mode, the RF path P13 may be selectively turned off. In the transmitting mode, RF signals may be transmitted from the node N12 to the common node NC via the RF path P13. In the transmitting mode, the RF path P11 and the RF path P12 may be selectively turned off. Furthermore, in an embodiment, the RF front-end module 400 may be operated in the receiving mode and the transmitting mode at the same time. Taking the transmitting mode as an example, in the RF path P13, the switch 310 may be turned on, and the RF path P13 may provide a low impedance for RF signals to be transceived via the RF path P13. The OFF-state switch 110 of the RF path P11 may provide a high impedance for the RF signals of the RF path P13. Similarly, the OFF-state switch 210 of the RF path P12 may also provide a high impedance for the RF signals of the RF path P13. In this case, the switches 110 and 210 in OFF state may function equivalently as capacitors. In other words, the switches 110 and 210 in OFF state may provide capacitive impedances for the RF signals of the RF path P13.

Figure 5:
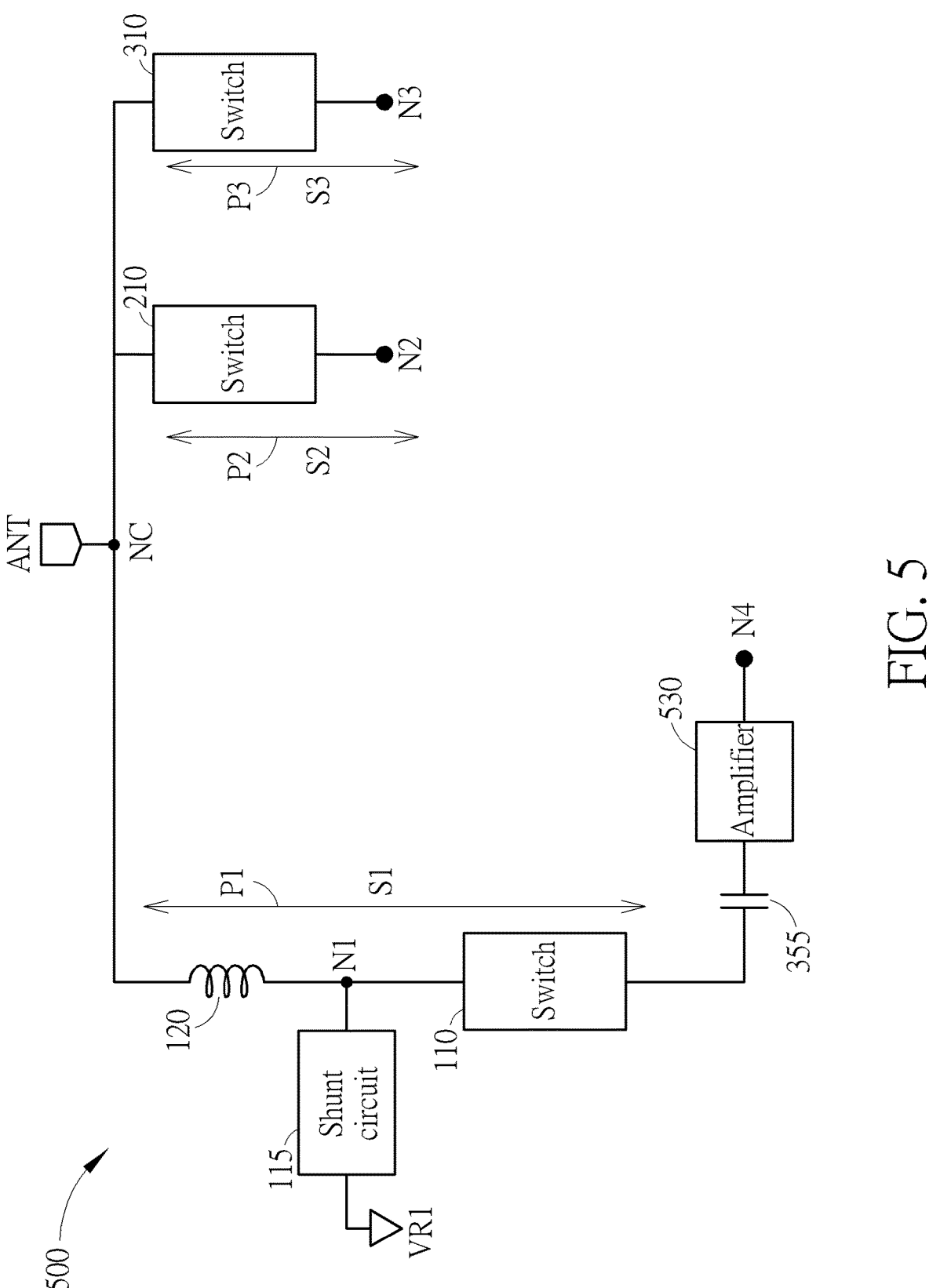

FIG. 5 illustrates a RF front-end module 500 according to another embodiment. The RF front-end module 500 may be similar to the RF front-end module 300, and the similarities may be not repeated. As shown in FIG. 5, in the RF front-end module 500, the RF path P1 may further include an amplifier 530. The amplifier 530 may include a first terminal and a second terminal, the first terminal may be coupled to the second terminal of the capacitor 355, and the second terminal may be coupled to the node N4. For example, the amplifier 530 may be a low noise amplifier (LNA), and the first terminal and the second terminal of the amplifier 530 may be an input terminal and an output terminal respectively. In this case, the RF path P1 may be a receiving path, and the RF paths P2 and P3 may be transmitting paths. When the RF signal S1 is transceived via the RF path P1, the switch 110 may be turned on and the RF signal S1 may be amplified by the amplifier 530, such that an amplified RF signal may be transceived to the node N4.

However, the disclosure may not be such limited. In other embodiments, the amplifier 530 may be a power amplifier (PA), the first terminal and the second terminal of the amplifier 530 may be an output terminal and an input terminal respectively. In this case, the RF signal S1 may be transmitted from the node N4 to the common node NC.

Figure 6:
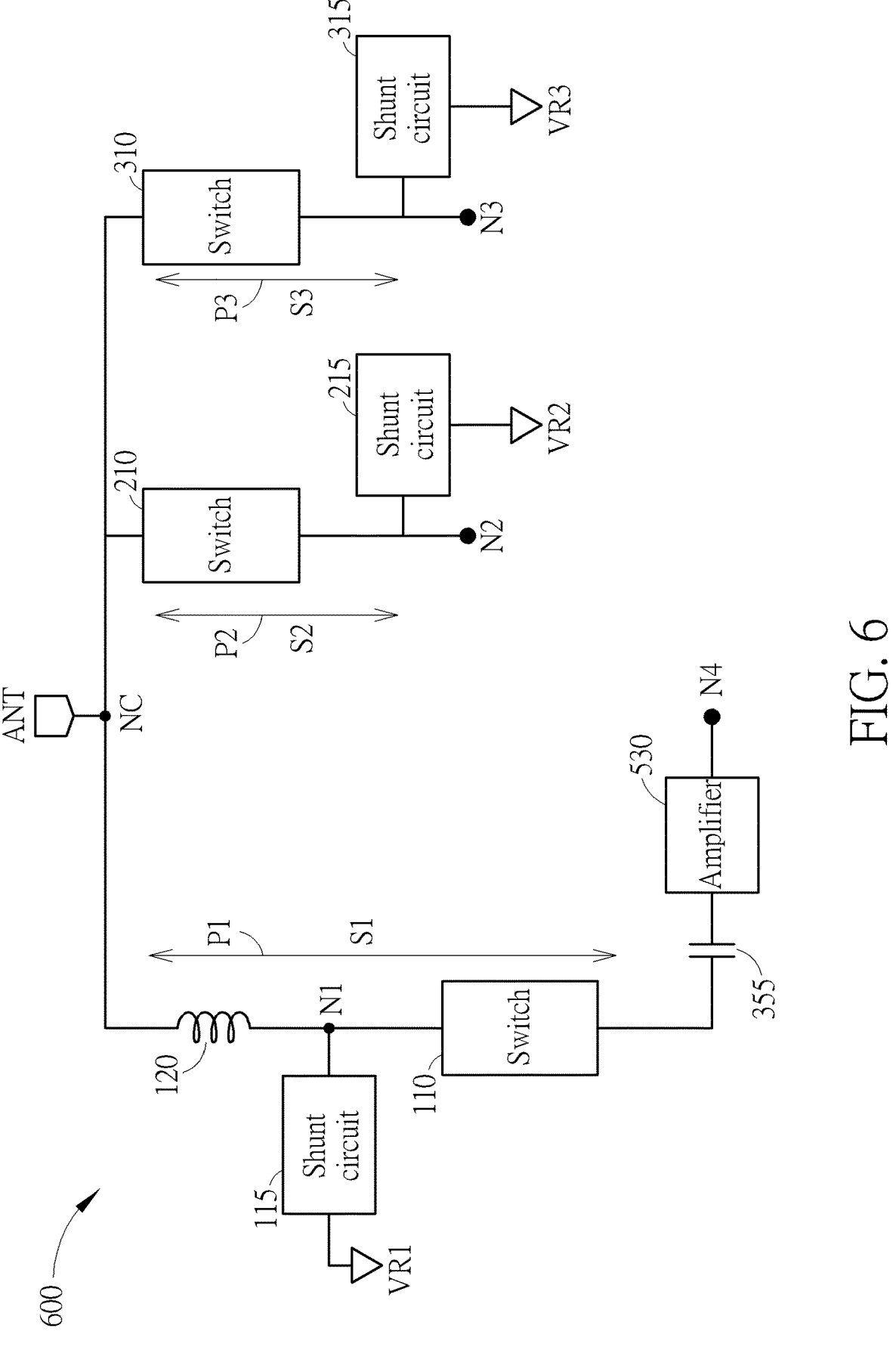

FIG. 6 illustrates a RF front-end module 600 according to another embodiment. The RF front-end module 600 may be similar to the RF front-end module, and the similarities may be not repeated. As shown in FIG. 6, in the RF front-end module 600, the RF paths P2 and P3 may further include shunt circuits 215 and 315 respectively. Taking the RF path P2 as an example, the switch 210 may include a first terminal and a second terminal, the first terminal may be coupled to the common node NC, and the second terminal may be coupled to the node N2. The shunt circuit 215 may include a first terminal and a second terminal, the first terminal may be coupled to the switch 210, and the second terminal may be coupled to a reference voltage node VR2. The first terminal of the shunt circuit 215 and the second terminal of the switch 210 may be both coupled to the node N2. In above embodiments, the operation states of the switch 210 and the shunt circuit 215 may be different from one another. For example, when the switch 210 is turned on, the shunt circuit 215 may be turned off, such that the RF signal S2 may be transceived between the common node NC and the node N2. When the switch 210 is turned off, the shunt circuit 215 may be turned on, such that undesired signals on the RF path P2 may be directed to the reference voltage node VR2. Moreover, the configuration of the switch 310 and the shunt circuit 315 in the RF path P3 may be similar to that of the switch 210 and the shunt circuit 215 in the RF path P2, and the similarities may be not repeated.

Figure 7:
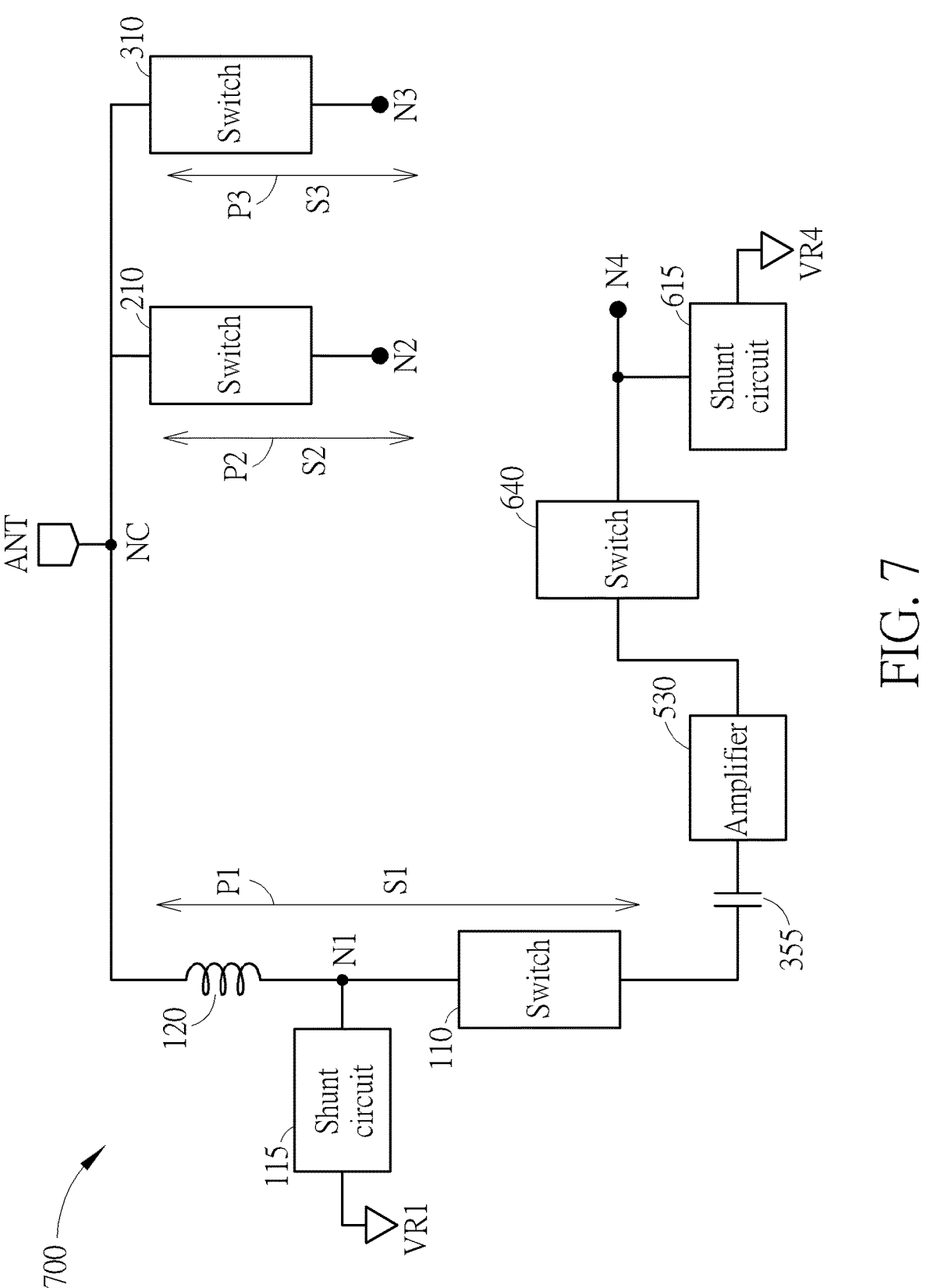

FIG. 7 illustrates a RF front-end module 700 according to another embodiment. The RF front-end module 700 may be similar to the RF front-end module 500, and the similarities may be not repeated. As shown in FIG. 7, in the RF front-end module 700, the RF path P1 may further include a switch 640 and a shunt circuit 615. The switch 640 may include a first terminal and a second terminal, the first terminal may be coupled to the second terminal of the amplifier 530, and the second terminal may be coupled to the node N4. In some embodiments, the first terminal of the switch 640 may be coupled to an output terminal of the amplifier 530 (e.g. LNA). The shunt circuit 615 may include a first terminal and a second terminal, the first terminal may be coupled to the second terminal of the switch 640, and the second terminal may be coupled to the reference voltage node VR4. Further, the second terminal of the switch 640 and the first terminal of the shunt circuit 615 may be both coupled to the node N4.

Furthermore, in the RF path P1, the switch 640 and the switch 110 may be operated in the same state, and the shunt circuit 615 and the shunt circuit 115 may be operated in the same state. For example, when the RF path P1 is turned on, the switches 110 and 640 may be turned on, such that the RF signal S1 may be transceived to the node N1 through the amplifier 530. In this case, the shunt circuit 115 and the shunt circuit 615 may be turned off to avoid affecting the signal transmission via the RF path P11. When the RF path P1 is turned off, the switch 110 and the switch 640 may be turned off. In this case, the shunt circuit 115 and the shunt circuit 615 may be turned on to shunt or direct undesired signals to the reference voltage node VR1 and/or the reference voltage node VR4. Therefore, the isolation of the RF front-end module 700 may be improved.

Figure 8:
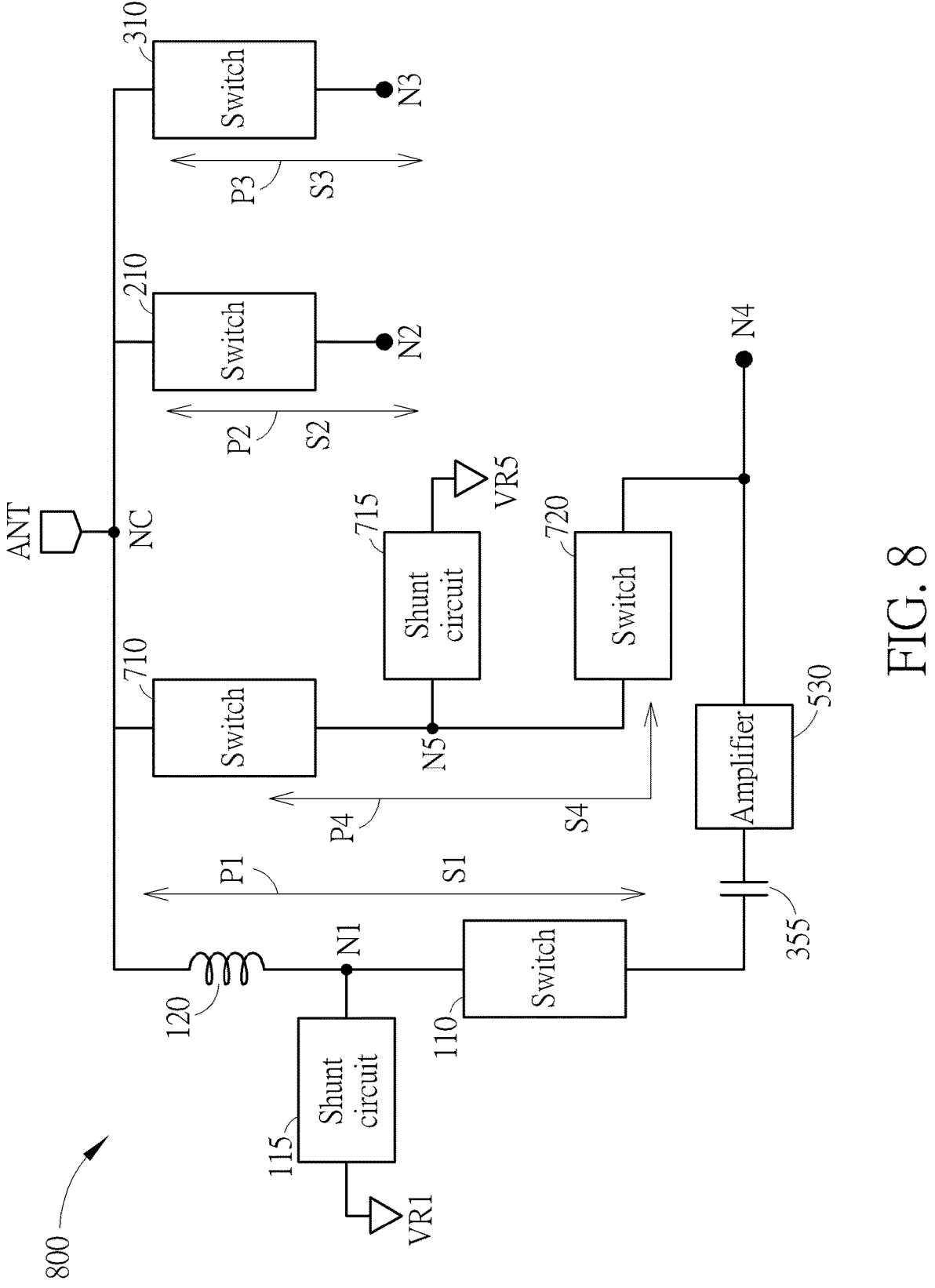

FIG. 8 illustrates a RF front-end module 800 according to another embodiment. The RF front-end module 800 may be similar to the RF front-end module 500, and the similarities may be not repeated. As shown in FIG. 8, the RF front-end module 800 may further include a RF path P4 coupled in parallel with the RF path P1 between the common node NC and the node N4. In some embodiments, the RF path P4 may function as a bypass path for the RF path P1.

In some embodiments, the RF path P4 may include a switch 710, a shunt circuit 715 and a switch 720. The switch 710 may include a first terminal and a second terminal, and the first terminal may be coupled to the common node NC. The shunt circuit 715 may include a first terminal and a second terminal, the first terminal may be coupled to the second terminal of the switch 710, and the second terminal may be coupled to a reference voltage node VR5. The switch 720 may include a first terminal and a second terminal, the first terminal may be coupled to the second terminal of the switch 710, and the second terminal may be coupled to the node N4. Moreover, the second terminal of the switch 710, the first terminal of the shunt circuit 715 and the first terminal of the switch 720 may be all coupled to the node N5.

For example, in FIG. 8, the RF paths P1 and P4 may be receiving paths, and the RF paths P2 and P3 may be transmitting paths. In some embodiments, the operation states of the RF paths P1 and P4 may be opposite, where one of the RF paths P1 and P4 may be turned on and the other one may be turned off. For example, when the RF signal S1 received by the antenna ANT has a lower amplitude or power, the RF path P1 may be turned on and the RF signal S1 may be transceived via the RF path P1 to the node N4, where the RF signal S1 be amplified by the amplifier 530. In this case, the RF path P4 may be turned off. When the RF signal S4 received by the antenna ANT has a higher amplitude or power, the RF path P4 may be turned on and the RF signal S4 may be transceived via the RF path P4 to the node N4, where the RF signal S4 may not be amplified. In this case, the RF path P1 may be turned off.

Moreover, when the RF path P1 or P4 is turned on, the RF paths P2 and P3 may be turned off.

In a first example, when the RF path P4 functioning as a receiving path is turned on (e.g. the switch 710 is turned on), the RF paths P1, P2 and P3 may be all turned off. In this case, the switch 210 of the RF path P2 and the switch 310 of the RF path P3 may be turned off. The switches 210 and 310 in OFF state may provide capacitive impedances for the RF signal S4 of the RF path P4. Moreover, since the shunt circuit 115 of the RF path P1 may be turned on, the second terminal of the inductor 120 may be coupled to the reference voltage node VR1 (e.g. a grounding node). Therefore, the inductor 120 of the RF path P1 may provide an inductive impedance for the RF signal S4 of the RF path P4, and the inductive impedance may at least partially counteract the capacitive impedances provided by the switches 210 and/or 310.

In a second example, when the RF path P2 functioning as a transmitting path is turned on (e.g. the switch 210 is turned on), the RF paths P1, P4 and P3 may be all turned off. In this case, the OFF-state switch 710 of the RF path P4 and the OFF-state switch 310 of the RF path P3 may provide capacitive impedances for the RF signal S2 of the RF path P2. Moreover, similar to the above example, the second terminal of the inductor 120 of the RF path P1 may be for example grounded. Therefore, the inductor 120 may provide an inductive impedance for the RF signal S2 of the RF path P2, and the inductive impedance may at least partially counteract the capacitive impedances provided by the switches 710 and/or 310.

In the above examples, the inductive impedance provided by the inductor 120 may be used to counteract the capacitive impedance provided by switches in OFF state, and a combined impedance may be generated based on the inductive impedance and the capacitive impedance. As for the RF signals transceived in the RF front-end module 700 (e.g. the RF signal S4 in the first example, or the RF signal S2 in the second example), an imaginary part of the combined impedance may therefore have a smaller absolute value which may more approximate zero. Therefore, the combined impedance may more approximate a desired impedance of the system. As a result, the return loss may be reduced according to embodiments.

Figure 9:
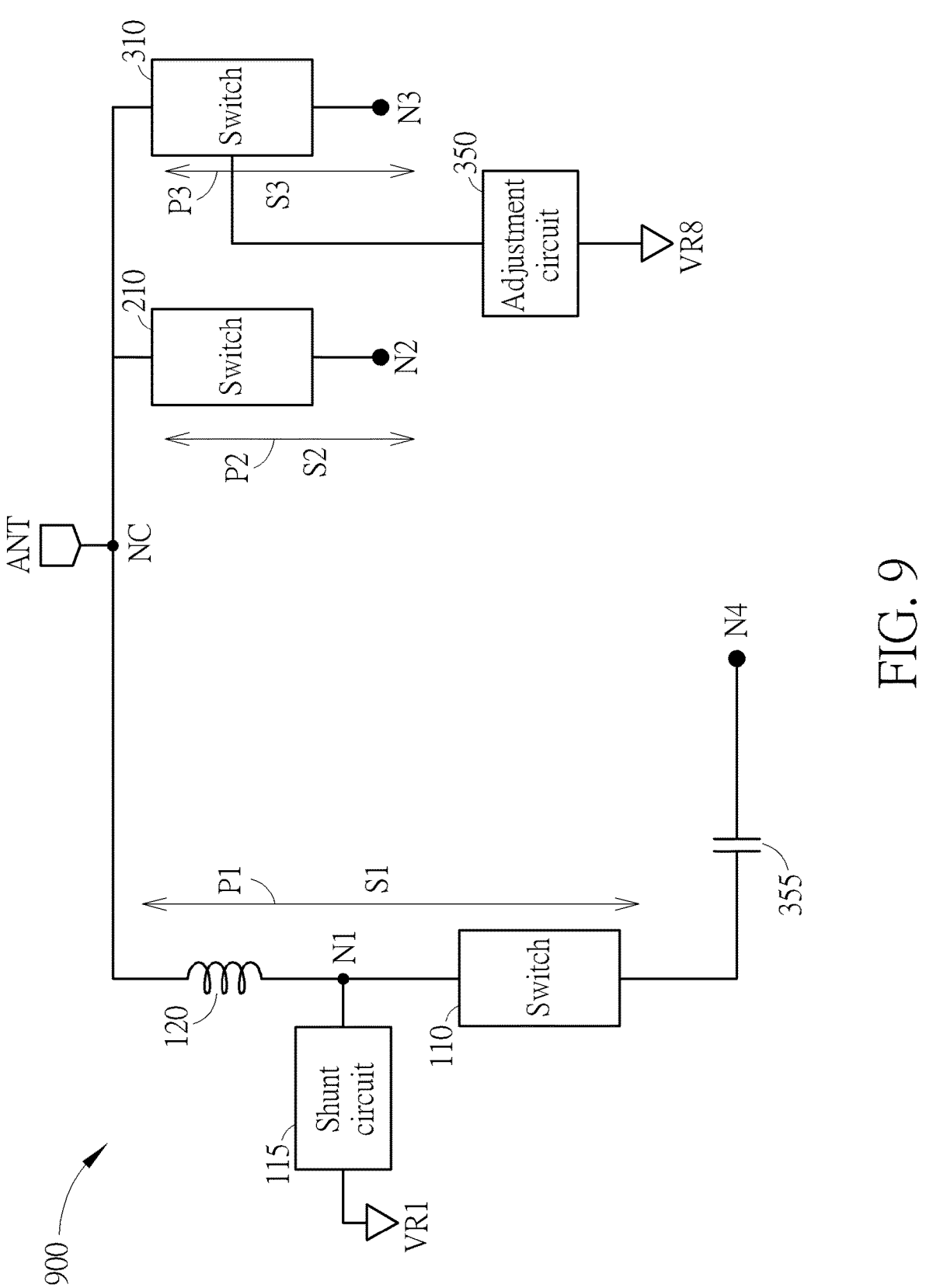

FIG. 9 illustrates a RF front-end module 900 according to another embodiment. The RF front-end module 900 may be similar to the RF front-end module 300 of FIG. 3, and the similarities may be not repeated. As shown in FIG. 9, the RF front-end module 900 may optionally include an adjustment circuit 350 coupled to the switch 310. As shown, the adjustment circuit 350 may include a first terminal and a second terminal, the first terminal may be coupled to the switch 310, and the second terminal may be coupled to a reference voltage VR8. When the switch 310 is turned off, the switch 310 may provide a capacitive impedance, and the adjustment circuit 350 may be configured to adjust the capacitive impedance provided by the switch 310. For example, the switch 310 may illustratively include n transistors coupled in series, where n is a positive integer and n>1. The first terminal of the adjustment circuit 350 may be coupled to a node between the ith one and the (i+1)th one of the n transistors included in the switch 310, where i is a positive integer, and 0<i<n. If the capacitive impedance provided by the switch 310 (which is in OFF-state) is small and insufficient, the adjustment circuit 350 may be turned on to bypass the (i+1)th transistor to the nth transistor. The capacitive impedance provided by the switch 310 may be generated from the first transistor to the ith transistor of the switch 310, without the (i+1)th to the nth ones. In this way, the capacitive impedance provided by the switch 310 may be increased.

In some embodiments, the plurality of the reference voltage nodes in FIG. 1 to FIG. 9 may be the same reference voltage node which may be, for example, but not limited to, a grounding node. In other embodiments, the plurality of the reference voltage nodes in FIG. 1 to FIG. 9 may provide different reference voltages.

Figure 10:
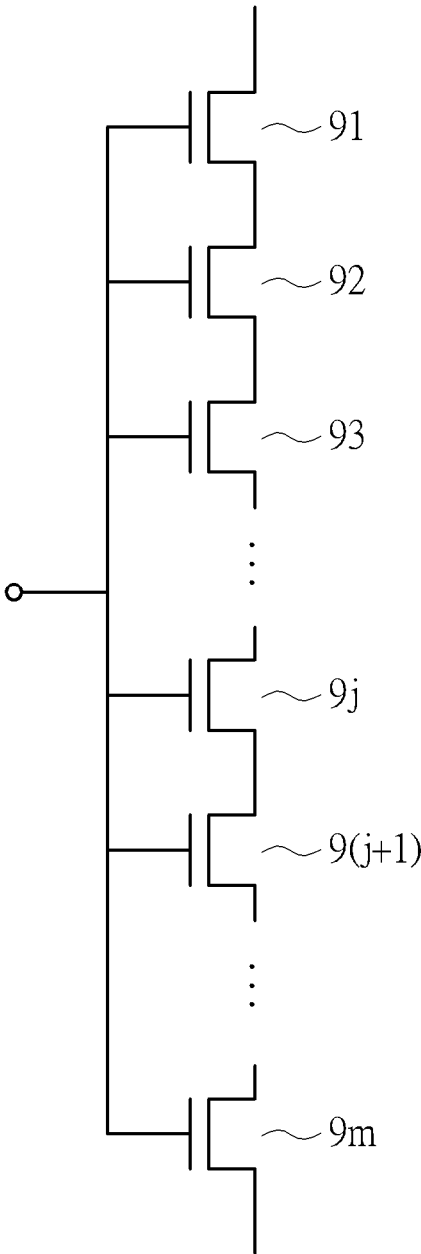
FIG. 10 illustrates a switch or a shunt circuit according to some embodiments.

FIG. 10 illustrates a switch or a shunt circuit according to some embodiments. As shown in FIG. 10, any of the abovementioned switches or shunt circuits may include a plurality of transistors 91 to 9*m* coupled in series, where m is a positive integer and m>1. Specifically, a first terminal of the (j+1)th transistor (marked as 9(*j*+1) in FIG. 10) may be coupled to a second terminal of the jth transistor (marked as 9*j* in FIG. 10), where j is a positive integer and 0<j<m. In FIG. 10, control terminals of the transistors 91 to 9*m* may be further coupled together, so as to receive a control signal, and the control signal may be provided to control the operation state of the switch or shunt circuit. For example, the operation state may include an ON state or an OFF state. In other embodiments, the control terminals of the transistors 91 to 9*m* may receive control signals separately.

Figure 11:
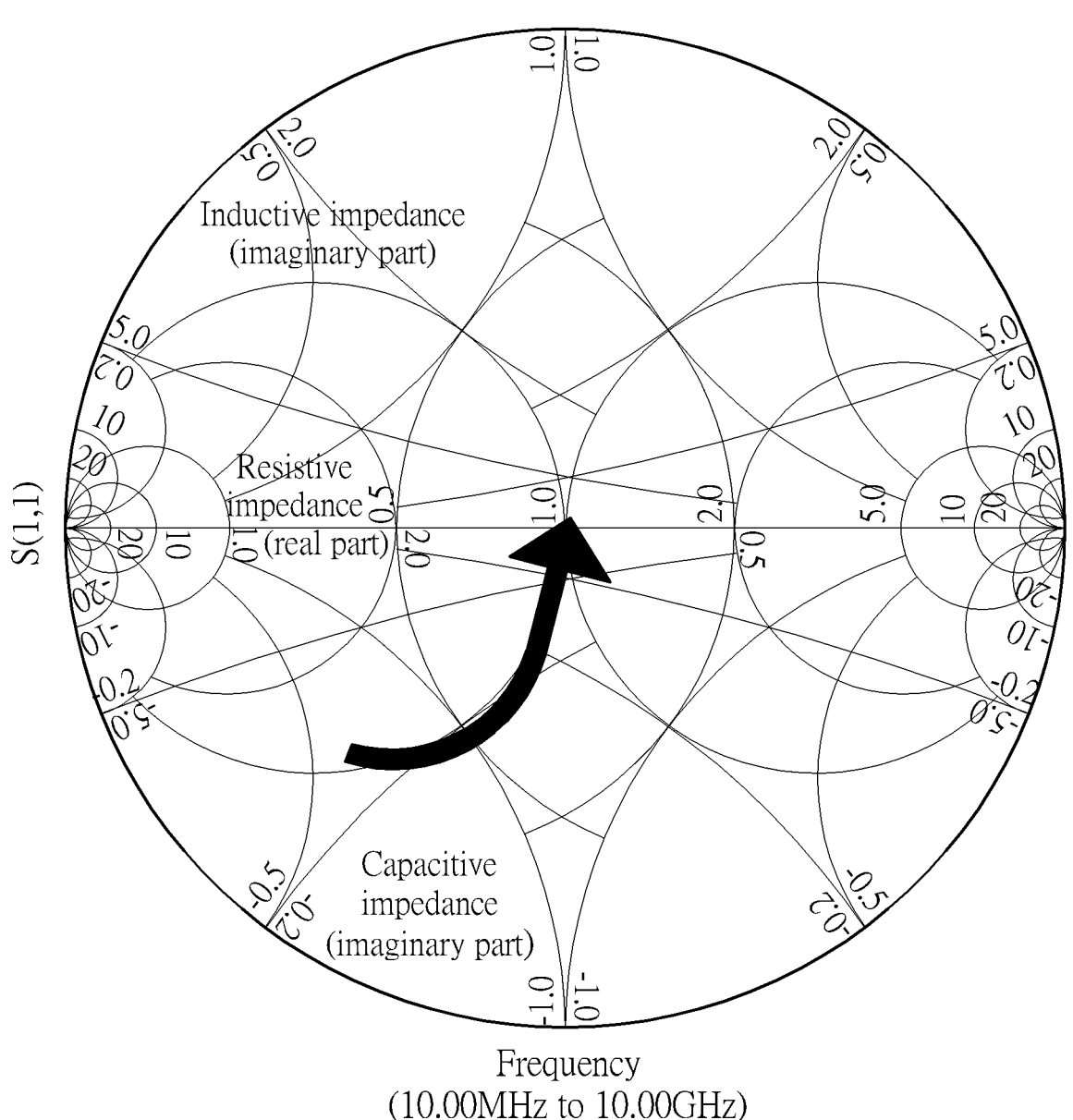
FIG. 11 illustrates a Smith chart according to an embodiment.

FIG. 11 illustrates a Smith chart according to an embodiment. FIG. 11 may correspond to a frequency range between 10 megahertz (MHz) and 10 gigahertz (GHz). In FIG. 11, the upper part of the Smith chart may correspond to an inductive impedance (e.g. an imaginary part). The lower part of the Smith chart may correspond to a capacitive impedance (e.g. an imaginary part). A horizontal central line passing through the center of the Smith chart may correspond to a desired impedance of the system (e.g. real part). In some embodiments, an inductor (e.g. the inductor 120) coupled to a reference voltage node may provide an inductive impedance, and the inductive impedance may be configured to at least partially counteract the capacitive impedances provided by other components (e.g. switches in OFF state), such that a combined impedance may correspond to a location closer to the horizontal central line of the Smith char. That is, the combined impedance may more approximate the desired impedance of the system (e.g. real part). As a result, according to any of the RF front-end modules provided above and its modifications, return loss may be reduced, and/or the noise figure (NF) may be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A radio-frequency (RF) front-end module comprising:
a common node;
a first node;
a second node;
a third node;
a first path disposed between the common node and the first node and comprising a first inductor;

a second path disposed between the common node and the second node and comprising a second switch, wherein the second path is configured to transceive a second RF signal; and
a third path disposed between the common node and the third node and comprising a third switch, wherein the third path is configured to transceive a third RF signal;
wherein when the second switch is turned on, the second path transceives the second RF signal and the third switch is turned off, such that the first inductor provides a first inductive impedance for the second RF signal and the third switch provides a first capacitive impedance for the second RF signal;
the first path is configured to transceive a first RF signal;
the first path further comprises a first shunt circuit and a first switch;
the first inductor comprises a first terminal coupled to the common node, and a second terminal;
the first shunt circuit comprises a first terminal coupled to the second terminal of the first inductor, and a second terminal coupled to a first reference voltage node;
the first switch comprises a first terminal coupled to the second terminal of the first inductor and coupled to the first terminal of the first shunt circuit, and a second terminal coupled to a fourth node; and
when the second switch is turned on, the first shunt circuit is turned on.

2. The RF front-end module of claim 1, wherein:
when the third switch is turned on, the third path is configured to transceive the third RF signal and the second switch is turned off, such that the first inductor may provide a second inductive impedance for the third RF signal and the second switch provides a second capacitive impedance for the third RF signal;
the second RF signal has a second frequency;
the third RF signal has a third frequency; and
the third frequency is different from the second frequency.

3. The RF front-end module of claim 1, further comprising:
an adjustment circuit coupled to the third switch;
wherein when the third switch is turned off, the adjustment circuit is configured to adjust the first capacitive impedance provided by the third switch for the second RF signal.

4. The RF front-end module of claim 1, wherein:
the first path further comprises an amplifier;
the amplifier comprises a first terminal coupled to the first switch, and a second terminal coupled to the fourth node; and
when the first switch of the first path is turned on, the amplifier amplifies the first RF signal and outputs an amplified first RF signal.

5. The RF front-end module of claim 4, wherein:
the first RF signal is transceived from the common node to the fourth node; and
the second RF signal is transceived from the second node to the common node.

6. The RF front-end module of claim 4, wherein:
the second path further comprises a second shunt circuit;
in the second path, the second switch comprises a first terminal coupled to the common node, and a second terminal coupled to the second node;
the second shunt circuit comprises a first terminal coupled to the second node, and a second terminal coupled to a second reference voltage node;
the third path further comprises a third shunt circuit;

in the third path, the third switch comprises a first terminal coupled to the common node, and a second terminal coupled to the third node; and the third shunt circuit comprises a first terminal coupled to the third node, and a second terminal coupled to a third reference voltage node.

7. The RF front-end module of claim 4, wherein:

the first path further comprises a fourth switch and a fourth shunt circuit;

the fourth switch comprises a first terminal coupled to the second terminal of the amplifier, and a second terminal coupled to the fourth node; and the fourth shunt circuit comprises a first terminal coupled to the fourth node, and a second terminal coupled to a fourth reference voltage node.

8. The RF front-end module of claim 4, further comprising a bypass path coupled in parallel with the first path between the common node and the fourth node.

9. The RF front-end module of claim 8, wherein the bypass path comprises:

a fifth switch comprising a first terminal coupled to the common node, and a second terminal;

a fifth shunt circuit comprising a first terminal coupled to the second terminal of the fifth switch, and a second terminal coupled to a fifth reference voltage node; and a sixth switch comprising a first terminal coupled to the second terminal of the fifth switch, and a second terminal coupled to the fourth node.

10. The RF front-end module of claim 9, wherein:

when the second switch is turned on, the fifth switch is turned off, such that the fifth switch provides a third capacitive impedance for the second RF signal.

\* \* \* \* \*